United States Patent [19]
Byrne

[11] Patent Number: 6,028,267
[45] Date of Patent: Feb. 22, 2000

[54] ROTATABLE POWER CENTER SYSTEM

[76] Inventor: Norman R. Byrne, 2736 Honey Creek, NE., Ada, Mich. 49301

[21] Appl. No.: 09/059,272

[22] Filed: Apr. 13, 1998

Related U.S. Application Data

[60] Provisional application No. 60/043,029, Apr. 15, 1997.

[51] Int. Cl.[7] .................................................. H01R 13/46
[52] U.S. Cl. .............................. 174/59; 174/55; 174/57; 220/3.7; 439/139; 361/610; 312/30
[58] Field of Search .................................. 174/53, 55, 58, 174/59, 48, 49, 57; 220/3.7, 4.02; 439/131, 535; D8/353; 312/22, 30; 292/DIG. 31; D13/138.1, 138.2; 361/610, 625, 725

[56] References Cited

U.S. PATENT DOCUMENTS

| | | |
|---|---|---|
| D. 353,363 | 12/1994 | Toby . |
| D. 355,890 | 2/1995 | Lentz . |
| D. 370,622 | 6/1996 | Byrne . |
| D. 372,018 | 7/1996 | Byrne . |
| D. 392,254 | 3/1998 | Gevaert . |
| 676,622 | 6/1901 | Gochnauer . |
| 2,811,574 | 10/1957 | Guerrero . |
| 2,861,857 | 11/1958 | Lee et al. . |
| 3,131,512 | 5/1964 | MacLeod, Jr. . |
| 3,353,137 | 11/1967 | Miller . |
| 3,433,886 | 3/1969 | Myers . |
| 3,622,684 | 11/1971 | Press . |
| 3,646,244 | 2/1972 | Cole . |
| 3,794,956 | 2/1974 | Dubreuil . |
| 3,892,095 | 7/1975 | Vankuik et al. . |
| 3,972,579 | 8/1976 | Kohaut . |
| 3,992,070 | 11/1976 | Dunn et al. . |
| 4,059,321 | 11/1977 | Rasmussen et al. . |
| 4,272,643 | 6/1981 | Carroll et al. . |
| 4,372,629 | 2/1983 | Propst et al. . |
| 4,511,198 | 4/1985 | Mitchell et al. . |
| 4,551,577 | 11/1985 | Byrne . |
| 4,747,788 | 5/1988 | Byrne . |
| 4,792,881 | 12/1988 | Wilson et al. . |
| 4,828,513 | 5/1989 | Morrison et al. . |
| 4,967,041 | 10/1990 | Bowman ................................ 174/48 |
| 4,984,982 | 1/1991 | Brownlie et al. . |
| 5,023,396 | 6/1991 | Bartee et al. . |
| 5,114,365 | 5/1992 | Thompson et al. . |
| 5,122,069 | 6/1992 | Brownlie et al. . |
| 5,230,552 | 7/1993 | Schipper et al. . |
| 5,231,562 | 7/1993 | Pierce et al. . |
| 5,351,173 | 9/1994 | Byrne . |
| 5,387,761 | 2/1995 | Simonis ................................... 174/67 |
| 5,516,298 | 5/1996 | Smith ..................................... 439/131 |
| 5,575,668 | 11/1996 | Timmerman . |
| 5,705,772 | 1/1998 | Brown . |
| 5,709,156 | 1/1998 | Gevaert et al. . |

FOREIGN PATENT DOCUMENTS

0975852  10/1975  Canada .................................. 439/131

Primary Examiner—Kristine Kincaid
Assistant Examiner—Dhiru R Patel
Attorney, Agent, or Firm—Varnum, Riddering, Schmidt & Howlett LLP

[57] ABSTRACT

Embodiments of power center systems are provided which include manually operable and rotatable carriages. The rotatable carriages include component sections where electrical and communication components may be incorporated. The components include electrical receptacles and communications/data ports. The receptacles and data ports may be connected to incoming power and communication cables. When a carriage is rotated to an open position, power cords and communication lines may be connected to appropriate ones of the receptacles and data ports. Slack sections of the cords and lines may be placed within an open area below a work surface within which the power center system is placed. A cover portion of a carriage includes slots allowing the cords and lines to remain energized with the receptacles and data ports, when the cover is in a closed position. The carriages include covers having front and rear portions, rotatable relative to each other through hinges. The power center system includes pairs of cylindrical stubs extending outward at opposing sides of the carriages. The stubs rotatably rest on corresponding ones of receiving flanges located in the sides of stationary housings. With these configurations, an axis of rotation is provided for a carriage which is below a plane extending substantially through an upper portion of the stationary housing at the location of the cover.

20 Claims, 7 Drawing Sheets

ROTATABLE POWER CENTER SYSTEM

PRIOR APPLICATIONS

This Application claims priority of United States provisional application Ser. No. 60/043,029 filed Apr. 15, 1997.

BACKGROUND OF THE INVENTION

1. Field of the Invention

The invention relates to electrical power systems and, more particularly, to power center systems having electrical receptacles, voice/data communication ports and/or similar devices mountable in furniture assemblies and the like.

2. Description of Related Art

The use of computers, sophisticated telecommunications equipment and other electronic devices is continuing to rapidly increase in commercial, industrial and other office environments. As a result, the importance of efficiently supplying power throughout these environments is also increasing. Historically, one problem common to the use of electrical power and communications equipment is the positioning of electrical power outlet communication ports, such as conventional RS-232 voice/data interface connectors. Positioning of these devices is important with respect to both convenience and cost efficiency. Electrical receptacles and communication ports for supplying power and communication signals to various types of devices (lighting, computers, etc.) must be located in accessible positions for all types of use.

However, the cost of electrical materials rapidly increases as the number of power source receptacles and associated equipment is increased. In addition, and perhaps more importantly, the conventional design of single- or double-unit receptacles (for both electrical power and communications) within walls or floor surfaces, which are often a substantial distance from the devices to be powered or with which to communicate, cause unsightly and sometimes dangerous arrays, and may result in entanglements of the electrical cords and communications wires connected to the devices.

To overcome the problems associated with efficiency and convenience of electrical and communications outlet design, it is not uncommon to employ multiple receptacle raceways having a number of receptacles or ports with a common power source cord or communications cable plugged into a utility or commercial communications company's outlet. Again, however, the raceways result in unsightly and entangled arrays of electrical cords and communication lines. In addition, such raceways are often located on floor surfaces and are not particularly convenient.

It is also known to employ electrical receptacles and communications ports (commonly known as "data ports") rigidly and directly mounted to various types of furniture, such as book shelves and desks. These receptacles may be mounted at a location substantially above the floor surface, and allow the user to interconnect electrical and communications devices nearer their location of use, thereby avoiding the necessity of running device cords and cables a substantial distance. However, rigidly secured receptacles and data ports must be mounted in a manner so that the user can readily insert device plugs and corresponding communication port connectors. Accordingly, these receptacles and data ports are typically in a fairly "open" location, and the device cords again may prove to be unsightly and space consuming. If, alternatively, the receptacles are somewhat hidden from view, they can be difficult to access.

A system employing covered receptacles mounted within a work station is disclosed in Propst, U.S. Pat. No. 4,372,629 issued Feb. 8, 1983. The Propst et al. arrangement includes a desk top having a rear cover hinged to a vertical back panel. Receptacles are mounted to the lower portion of the cover and bristles extend horizontally from the cover to an edge of the desk top when the cover is closed. When the cover is open, the user can plug in the cord of a desired electrical device and close the cover, with the cord then extending through the bristles.

One relatively substantial advance over the prior art, relating to the mounting of electrical receptacles in a retractable manner in work surfaces and the like, is shown in the commonly owned Byrne, U.S. Pat. No. 4,551,577 issued Nov. 5, 1985. In the Byrne patent, a retractable power center includes a rectangular housing formed in the work surface, with a clamping arrangement to secure the housing to the work surface. A lower extrusion is connected to a lower portion of the housing, and a movable power carriage mounts receptacles. A catch assembly releasably maintains the carriage in a closed, retracted position. In response to manual activation, the catch assembly is released and springs tensioned between the carriage and the extrusion exert forces so as to extend the carriage upward into an extended open position. In the open position, the user can energize desired electrical devices from the receptacles, and then lower the carriage into the releasably secured, retracted position.

Although the foregoing Byrne patent represents a substantial advance with respect to retractable power centers mounted on work surfaces and the like, it can also be advantageous to employ a retractable power center having a relatively more simple construction. That is, the use of spring or similar arrangements can sometimes result in additional repair and maintenance costs. Further, the use of a relatively long extrusion and the spring assemblies can also result in higher initial costs.

In this regard, a further advance over the prior art was achieved with the commonly owned Byrne, U.S. Pat. No. 4,747,788 issued May 31, 1988. In this patent, a retractable power center is disclosed which is manually operable. The power center includes a stationary upper housing received within a slot formed within a work surface, and a clamping arrangement to secure the housing to the work surface. A manually movable and vertically slidable power carriage is utilized to mount the electrical receptacles. In response to manually exerted forces, the carriage can be extended vertically upward into an open position. Small bosses extend laterally from the sides of the carriage to provide a means to support the carriage in its extended position, with the bosses resting in the top portion of the housing. Ledges are integrally formed on the lateral sides of the carriage near the bottom portions thereof, so as to prevent any additional movement of the carriage upwardly relative to the housing.

An example of a device having electrical receptacles, data ports and other types of communication outlets is disclosed in Brownlie et al., U.S. Pat. No. 4,984,982 issued Jan. 15, 1991. The Brownlie patent illustrates an access flooring module to be mounted in an opening provided in an access floor. The module is movable between open and closed positions, and recesses are provided so as to receive electrical components such as power sockets or signal sockets. Electrical isolation is provided between certain components. In an alternative embodiment a high tension cable and low tension cable are interconnected to the rear of a module. The high tension cable is secured through a hard wire bracket, with the low tension cable secured through a data bracket. Cable ties are utilized to secure the cables to the rear of the module.

A device comprising both electrical power and data service lines, and specifically directed to use in a work surface, is disclosed in Timmerman, U.S. Pat. No. 5,575,668 issued Nov. 19, 1996. In the Timmerman patent, a temporary power/data tap is provided for delivering both electrical power and data service to a work surface from a distant standard wall or floor mounted electrical receptacle and data port. The power/data tap is movable between retracted and extended positions. The Timmerman patent illustrates a temporary power/data tap comprising an enclosure assembly, power distribution assembly, at least one outlet enclosure and a power cord. The enclosure assembly comprises a box structure having a top opening with two side surfaces and two removable end surfaces. The side surfaces include spot welded nuts on their inside surfaces for mounting the enclosure assembly to a work surface. The inside surface of the side surfaces of the box structure include rivets intruding into non-conductor space and serving as positive stops for the outlet enclosure housed therein. The end surfaces can also have openings for receiving a strain relief bushing or an electrical connector.

Disposed inside the enclosure assembly is a power distribution assembly for receiving and distributing electrical power through the enclosure assembly to the outlet enclosure. The power distribution assembly is an I-shaped structure comprising a first junction box and a second junction box. Each of the junction boxes includes a recessed central area with two centrally located conduit holes manufactured thereon which are used to attach one end of a metallic rigid conduit and a metallic flexible conduit. Trade holes are also manufactured on the inside surface near the upper edge of each junction box, for engaging bullet catches located on lateral sides of each outlet enclosure for purposes of limiting the upper rotation of the outlet enclosure from the enclosure assembly.

During assembly, the power distribution assembly is disposed inside the enclosure assembly over a bottom surface so that a rigid conduit is parallel with the longitudinal axis of the enclosure assembly, with the junction boxes disposed on opposite sides thereof. This concept is shown in FIG. 5 of the Timmerman patent. Electrical power is delivered to the enclosure assembly from a standard receptacle by means of a power cord. The power cord extends through a bushing attached to the side surface of the box structure.

In the embodiment shown in FIGS. 1 and 2 of Timmerman, two outlet enclosures are placed through the top opening and disposed in a side-by-side manner inside the enclosure assembly. A hinge is disposed between the two outlet enclosures or between one outlet enclosure and the enclosure assembly, thereby enabling the outlet enclosures to freely pivot inside the enclosure assembly. Each outlet enclosure is made of sheet metal and comprises a cover and a box member divided by a partition into first and second compartments. The cover is connected along its back edge by a full length hinge to the top surface of the box member. A connecting rod is used to interconnect the hinge element on the cover with the hinge elements located on an adjacent outlet enclosure or on the enclosure assembly. The box member is divided into a first compartment used to house high voltage electrical connections, and a second compartment used to house low voltage electrical connections, such as data service line connections. Each end of the box member is fitted with a bullet cache which engage trade holes manufactured on the sides of the adjacent junction box to limit the upward rotation of the outlet enclosure. Manufactured on a front surface of the box member are cutouts for receiving the electrical power receptacle and the data port. Manufactured on the bottom surface of the box member directly under the first compartment is an opening which enables a flexible conduit to be attached to the box structure. Attached over a rear opening of the box member is a removable cover. The cover fully encloses the first compartment and partially cover the rear opening of the second compartment, thereby providing a means for the data service line to enter the second compartment.

To mount the temporary tap to a work surface, a suitable opening is manufactured on the work surface slightly larger than the box structure. Mounting brackets are utilized to attach the box structure to the work surface. In general, the Timmerman patent shows the concept of a power center pivotable between open and closed positions, with the power center having both an electrical receptacle and a data port mounted in separate and isolated compartments.

SUMMARY OF THE INVENTION

In accordance with the invention, a power center is provided for purposes of supplying electrical power services and/or communication services. The power center includes a stationery housing forming an inner spatial area located below a plane extending substantially through an upper portion of the housing. Carriage means are provided which are coupled to the stationery housing, so as to be movable with respect to the housing between a closed, retracted position and an open, extended position. An energy source means is provided for supplying electrical power and/or voice/data service from interconnectable common power source lines and/or voice/data lines.

An energizing means is also provided. The energizing means is mounted to the carriage means and connected to the energy source means for supplying power and/or voice/data service from the energy source means to selectively interconnectable electrical and/or communication devices. Coupling means are also provided, which are connected to the stationary housing and to the carriage means. The coupling means form an axis of rotation about which the carriage means rotates relative to the stationery housing. The coupling means is positioned on the carriage means and the housing so that the axis of rotation is below the plane extending substantially through an upper portion of the housing.

The power center also includes cover means which are pivotably coupled to the carriage means. The cover means provide a cover for the power center when the carriage means is in the closed, retracted position. The carriage means can move between the closed, retracted position and the open, extended position through rotation about the axis of rotation. The axis of rotation remains stationery during movement of the carriage means from the closed, retracted position to the open, extended position.

The power center can include pivot means coupled to the cover means and to the carriage means for providing capability of pivotable movement of the cover means relative to the carriage means. The pivot means can comprise an axis of pivotable movement which moves rearwardly to the stationery housing, when the carriage means moves from the closed, retracted position to the open, extended position.

The power center is adapted to be mounted in a desk or other furniture component having a work surface. The power center is mounted at a selectable working height, and the stationery housing is adapted to be mounted within a slot formed in the work surface. The afore-referenced plane extends substantially through or adjacent the work surface.

When the carriage means is in the open, extended position, the energizing means are angled upwardly in a manner so as to be accessible to a user for purposes of interconnecting electrical cords and/or communication lines of the selectively interconnectable electrical and/or communication devices to the energizing means.

When the carriage means is in the closed, retracted position, the cover means is appropriately structured and the carriage means is appropriately positioned within the open area so that excess of the electrical cords and/or the communication lines interconnected to the energizing means may be stored within the open area. The carriage means and the cover means may be manually lifted upwardly from the stationery housing and reversed in position relative to the stationery housing, so that the energizing means are directed to a position opposing an original position, without requiring any assembly/disassembly of components of the power center.

The cover means can include a front cover portion and a rear cover portion. Pivot means can be provided which are connected to the front cover portion, the rear cover portion and the carriage means, for pivotably coupling the front cover portion to the rear cover portion. The front cover portion can be pivotable relative to the rear cover portion, and the front cover portion can move in unison with the carriage means. The rear cover portion can slide rearwardly relative to the stationery housing, when the carriage means is moved from the closed, retracted position to the open, extended position.

The front cover portion can include slot means which allow a user to manually manipulate the front cover portion when the carriage means is in the closed, retracted position.

The cover means can also include a rear cover portion pivotably coupled at its rear section to the stationery housing. A front cover portion can be provided which is separate from the rear cover portion and fixedly connected to the carriage means, so that the front cover portion moves in unison with movement of the carriage means. The rear cover can pivot about its pivot access relative to the stationery housing, so as to ride up the front cover as the front cover and the carriage means rotate about the axis of rotation.

The coupling means can include a pair of arcuate flanges mounted on opposing ends of the stationery housing. A pair of stubs can be provided, which extend outwardly from opposing lateral sides of the carriage means, with each of the stubs being adapted to freely rotate within an arcuate formed area of each of the flanges. The stationery housing can include vertically disposed front, rear and side portions, an upper horizontal flange and a pair of beveled ledges formed between the horizontal flange in the front and rear vertically disposed portions of the housing.

BRIEF DESCRIPTION OF THE DRAWING

The invention will now be described with reference to the drawing, in which.

DESCRIPTION OF THE PREFERRED EMBODIMENT

The principles of the invention are disclosed, by way of example, in a first embodiment of a rotatable power center system 100 as illustrated in FIGS. 1–5. The rotatable power center system 100 provides for readily accessible access, at a work surface level, to electrical power, data ports and other types of desired electrical and/or communication input/output. The rotatable power center system 100 is adapted to be maintained in a lower closed position, while still retaining the capability of interconnection of electrical and communication lines. Further, the power center system 100 is adapted to facilitate interconnection of electrical and communication lines when a rotatable carriage of the power center system 100 is moved through a path to an open, rotated position. Advantageously, the positioning of the axis of rotation and the relational movement of cover components serve to further facilitate interconnection of the electrical and communication lines, through providing a "larger" access area.

Other advantages are also provided by a rotatable power center in accordance with the invention. For example, as illustrated in additional drawings, a power center in accordance with the invention can be provided in a reversible mode, without any complex disassembly. In addition, and as earlier mentioned, the relationship of various components of the rotatable power center serves to facilitate interconnection of electrical and communication lines through providing a "larger" access area when the power center is in an open position. This open position also allows additional room for the wires or cables comprising the electrical and communication lines to be "tucked" into the spatial storage area. In addition, with the configuration of a rotatable power center in accordance with the invention, the wires or cables are somewhat "pushed together" when the rotatable power center is moved to a closed position. With this configuration, the "bulk" of the wires or cables can be located below the plane of a work surface and substantially hidden from view. In accordance with all of the foregoing, a rotatable power center in accordance with the invention facilitates providing a relatively large open area for wire or cable access, and a storage area for storing wire or cable excess.

Figure 1:
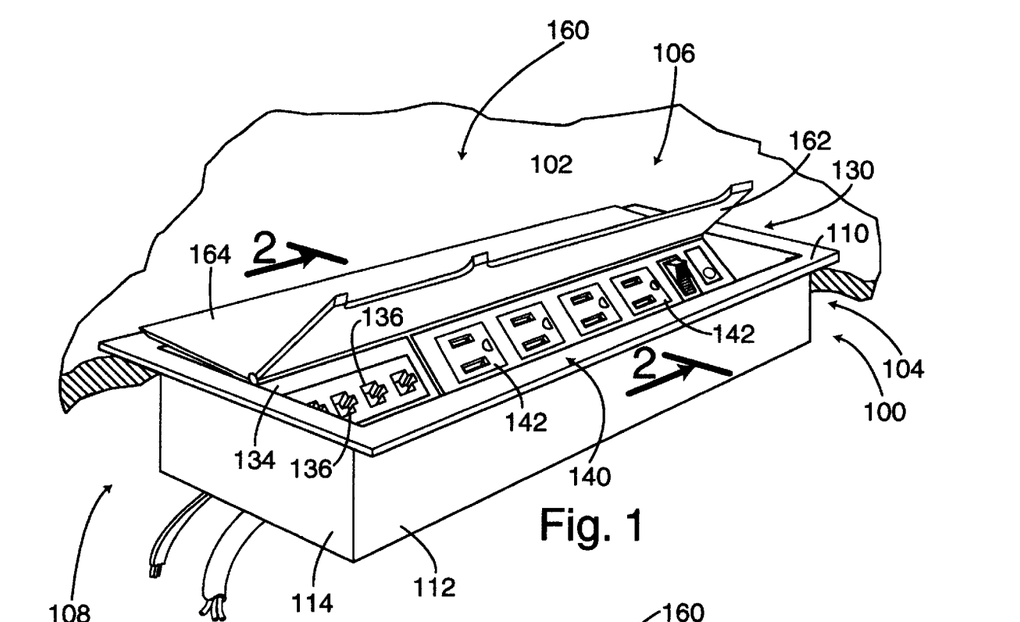
FIG. 1 is a partial, perspective view of a work station surface having an embodiment of a rotatable power center in accordance with the invention, with side portions of the work surface partially broken away.
Figure 2:
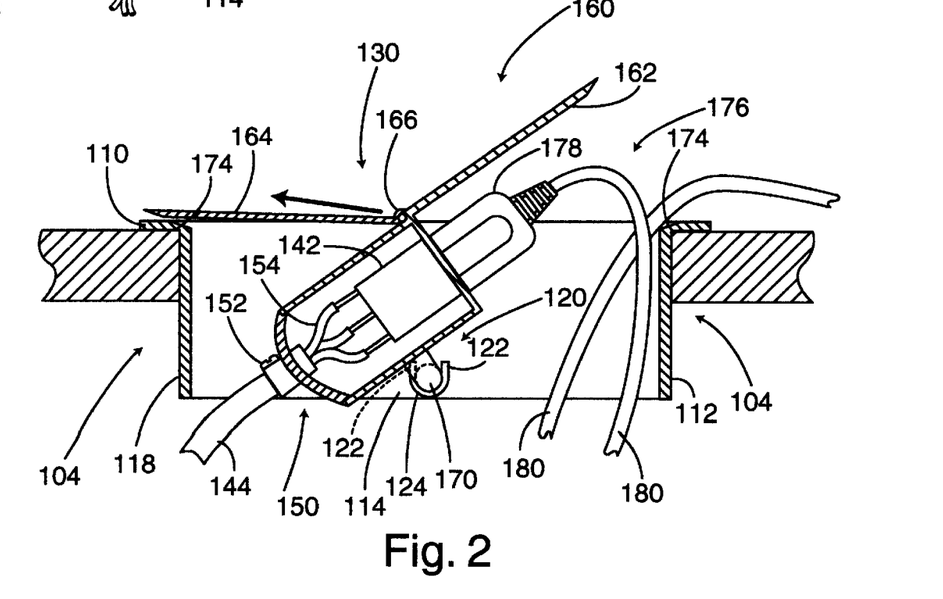
FIG. 2 is a sectional view of the rotatable power center illustrated in FIG. 1, taken along lines 2—2 of FIG. 1.

More specifically, with reference to the drawings, the power center system 100 is illustrated in FIG. 1 as being adapted to be mounted within a slot or opening, such as the slot 104, formed within a furniture component such as a work surface 102 as partially depicted in FIGS. 1 and 2. Work surface 102 can, for example, be the working surface of a desk or similar furniture component. Although not specifically shown in the drawings, the slot 104 may be rectangular or of a similar shape, for purposes of appropriately fitting the power center system 100.

Figure 3:
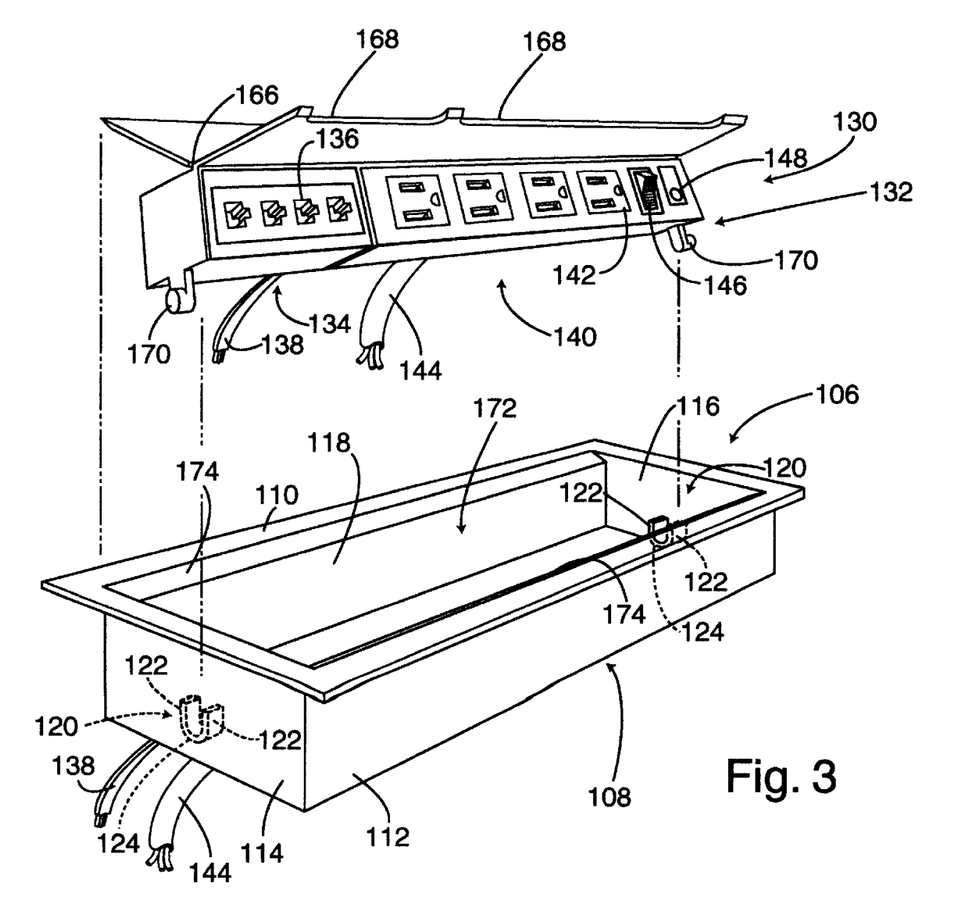
FIG. 3 is a partial exploded view of certain of the components of the rotatable power center illustrated in FIG. 1, and primarily showing the rotatable interconnection and the general axis of rotation of the power center carriage relative to the stationery housing.

The power center system 100, as particularly shown in FIGS. 1 and 3, includes a stationary housing 106, which may comprise a rectangular sleeve 108 and a horizontal flange 110. The rectangular sleeve 108 will be of a sufficient depth or length so as to appropriately cover and protect the electrical and communication components as described in subsequent paragraphs herein. The rectangular sleeve 108 is vertically disposed and includes a front vertical component 112 and two opposing vertical side components 114 and 116. The rectangular sleeve 108 also includes a rear vertical component 118, with the front and side components 112, 114, 116 and 118 integrally or otherwise connected to each other with appropriate means. These components 112, 114, 116 and 118 form a rectangular box or sleeve-like structure for protecting the electrical, communication and other components associated with the power center system 100.

Also integral with or otherwise appropriately connected to the rectangular sleeve 108 is the horizontal flange 110. As shown primarily in FIG. 3, the horizontal flange 110 is also rectangular in shape and should be of an appropriate size so as to provide support on the work surface 102 for the power center system 100 within the slot 104. The rectangular sleeve 108 may be appropriately sized and the power center system 100 may be configured so that the flange 110 merely rests on the upper portion of the work surface 102. Alternatively, if desired, screws or other connecting means may be utilized to rigidly secure the horizontal flange 110 and/or sleeve 108 to the work surface 102. General concepts associated with positioning and securing components such as stationary housing 106 within work surface slots or other openings for purposes of providing power center configurations is known, and an example of a configuration is shown in the commonly owned Byrne, U.S. Pat. No. 4,747,788 issued May 31, 1988 and incorporated by reference herein.

With reference to FIGS. 2 and 3, the stationary housing 106 also includes a pair of receiving flanges 120, each having a v-shaped configuration. Each receiving flange 120 is integral with or otherwise appropriately secured to an inner surface of a corresponding one of the vertical side components 114 and 116. Each receiving flange 120 includes a pair of walls 122 interconnected through a radius 124. The radius 124 and the walls 122 are appropriately sized so as to provide suitable rotation of a carriage portion of the power center system 100 as described in subsequent paragraphs herein. In this regard, it is important to position the receiving flange 120 an appropriate vertical distance below the horizontal flange 110 so as to provide proper spacing and operation of the power center system 100. Although the receiving flanges 120 are illustrated as u-shaped channels, it should be emphasized that various configurations for the receiving flanges 120 may be used, without departing from the spirit and scope of the primary novel concepts of a rotatable power center in accordance with the invention.

With reference primarily to FIGS. 1, 2 and 3, the power center system 100 also includes a manually operable and rotatable power center carriage 130. The rotatable carriage 130 includes a component section 132 into which a selective number and type of electrical and communication components may be incorporated. These components may generally be assembled and incorporated in a manner as desired by the purchaser of the power center system. For example, and as shown primarily in FIGS. 1 and 3, the component section 132 may include receptacle devices comprising a voice/data communications section 134 having a series of data ports 136 for purposes of providing communications interfaces, such as conventional RS-232 communication connectors. The data ports 136 may be connected through a conventional communications cable 138 to an incoming/outgoing conventional communications port located below the work surface 102 at the floor level or at any other conventional location. The incoming/outgoing communication connector is not shown in the drawings. However, the concept of utilizing data ports, incoming/outgoing communications components and data service lines is shown, for example, in Timmerman, U.S. Pat. No. 5,575,668 issued Oct. 6, 1995.

The component section 132 may also include a conventional electrical receptacle section 140 comprising a series of conventional electrical receptacles 142 for supplying power to AC voltage office equipment and similar devices. As described in greater detail in subsequent paragraphs herein, the electrical receptacles 142 may be interconnected to conventional incoming power cables 144. The incoming power cables 144 may each be energized through interconnection at their distal ends to conventional incoming AC power outlets located at a floor surface or other area. The AC power outlets are not shown on the drawings.

In addition to the electrical power receptacle section 140, the component section 132 may also include conventional electrical devices such as an on/off switch 146 which may, if desired, be interconnected with other components of the section 132 so as to provide a single location for energizing or de-energizing both high and low voltage power provided through the section 132. Still further, if appropriate and desired, a conventional circuit breaker 148 or similar device may be provided and appropriately interconnected for purposes of protection. Although not shown in the drawings, it is apparent that other types of electrical, communication and protective components may be incorporated within the component section 132. For example, although not shown in the drawings, a power surge protector could be utilized within the component section 132 for purposes of providing protection for sensitive electronic communications equipment which may be energized and interconnected through the component section 132.

As earlier stated, interconnections of the communications service cable 138 and power cables 144 to the appropriate receptacles of the component section 132 are conventional in design and do not comprise any portions of the novel concepts of the invention. These types of interconnections are well known in the electrical arts. However, for purposes of providing additional information, FIG. 2 illustrates some additional specifics with regard to interconnection of the incoming power cable 144 to a corresponding one of the electrical receptacles 142. More specifically, with reference to FIG. 2, a cable clamp 150 is located near one side of a rear portion of the component section 132 of carriage 130. Although not shown in FIG. 2, a second cable clamp may be located on an opposing side of the component section 132. The cable clamp 150 may be employed to maintain position and appropriately secure the incoming power cable 144 entering the area of the carriage 130. A screw 152 or similar device may be utilized with the cable clamp 150 for purposes of appropriately clamping and securing the power cable 144 so as to provide strain relief and prevent any damage from tension which may be exerted on the cable 144.

As further shown in FIG. 2, the incoming power cable 144 may comprise three conventional shielded wires 154, with each of the wires providing appropriate hot, neutral and ground connections for the conventional electrical receptacles 142. The conventional interconnections of the wires 154 to the receptacles 142 is relatively well known and not specifically illustrated in the drawings. Further, for purposes of appropriately securing and providing protection for strain relief with regard to communication cables, the communications cable 138 shown in FIG. 1 may also be connected through an appropriate second cable clamp, similar to the illustrated cable clamp 150 (the second cable clamp not being shown in the drawings), with the second cable clamp located on the opposing side of the component section 132. Again, the specific interconnections of the incoming power and communication service cables and lines, with the receptacle and data port portions of the component section 134, are not of primary importance. Of importance to the invention is the concept that such interconnections would not prevent rotatable movement of the power center carriage 130 as described in subsequent paragraphs herein.

The power center carriage 130 also includes a cover 160 comprising a substantially rectangular front portion 162 and a substantially rectangular rear portion 164. The front portion 162 and rear portion 164 are rotatable relative to each other and interconnected through a piano-type hinge 166 which extends lengthwise (FIG. 4) between the cover portions 162, 164. The piano-type hinge 166 provides a means for rotation of the cover portion 162 relative to the portion 164.

The component section 132 of the power center carriage 130 is secured by an appropriate connecting means to the front rectangular cover portion 162, (not shown) or is otherwise integral with the front rectangular cover portion 162, and positioned below and to the rear of the same. This configuration is primarily shown in FIGS. 2 and 3. Accordingly, when the front rectangular portion 162 of the cover 160 is rotated relative to the rear rectangular portion 164 of cover 160 (through the action of the hinge 166), the component section 132 will move in correspondence and simultaneously with the front rectangular portion 162.

Figure 4:
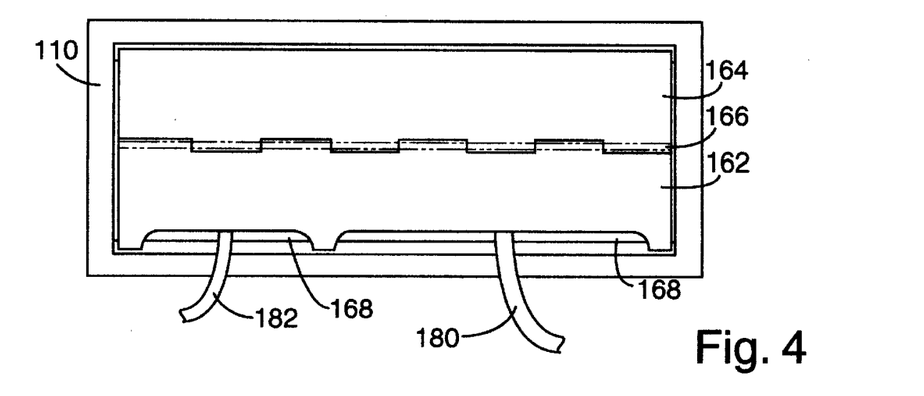
FIG. 4 is a plan view of the rotatable power center, when the power center is in a closed position, with electrical and data line interconnections to the power center carriage.

In addition to the piano-type hinge 166 and the cover portions 162, 164, the cover 160 also includes a pair of slots 168 as primarily shown in FIG. 4. The slots 168 will allow for extension of power and communication cables energized through use of the power center system 100 when the cover 130 is in a closed position, as described in subsequent paragraphs herein. Also, it should be noted at this time that excess of the power and communication cables energized through the use of the power system 100 may be stored below the cover 160 and substantially hidden from view during use.

With reference primarily to FIGS. 2 and 3, the power center carriage 130 also includes a pair of protruding stubs 170, which may be cylindrical in configuration and extend laterally outward at opposing sides of the component section 132. When the power center carriage 130 is inserted within the stationary housing 106, each of the cylindrical stubs 170 will rotatably rest on a corresponding one of the receiving flanges 120. The location of each of the stubs 170 relative to the location of the cover 160, and the location of the receiving flanges 120 relative to the general height of the stationary housing 106, should be such that the flanges 120 and stubs 170 substantially support the power center carriage 130 with the cover portions 162, 164 at the general height of the horizontal flange 100 when the cover 160 is in the closed position.

The operation of the power center system 100 will now be described with respect to the drawings. As previously mentioned, the stationary housing 106 can be appropriately fitted within the slot 104 of the work surface 102, with the horizontal flange 110 resting on an upper portion of the work surface 102. If desired, the housing 106 may be rigidly secured within the slot 104 by an appropriate connecting means (not shown). The power center carriage 130 can then be appropriately placed within the open area 172 formed by the side and front/rear portions of the rectangular sleeve 108. With this configuration, the stubs 170 will matingly and rotatably fit within a corresponding one of the receiving flanges 120 integral with or otherwise connected to the inner surfaces of each of the vertical side components 114, 116. With this configuration, the power center system 100 may be characterized as being in a closed position, with the power center carriage 130 also being characterized as being in a closed position. In this position, each of the portions 162, 164 of the cover 160 are in a substantially horizontal orientation. In the particular configuration and in accordance with the particular embodiment disclosed herein, the rear cover portion 164 may have its end portion substantially resting on the horizontal flange 110 as shown in FIG. 2. However, for purposes of access and convenience, the rectangular sleeve 108 of the stationary housing 106 may be formed so as to provide front and rear ledges 174 formed within the open area 172 as primarily shown in FIGS. 2 and 3. As shown in FIG. 4, the front rectangular portion 162 of the cover 160 may be appropriately sized so that when the cover portion 162 is in the closed position, the end of the cover portion 162 rests on the front one of the ledges 174. In addition, the cover 160 may be sized so that the rear portion 164 is maintained resting on the rear one of the ledges 174. This configuration is also shown in FIG. 4. Further, with the cover 160 is in the closed position, the center of gravity of the carriage 130 may be such as to maintain the carriage 130 in the closed position, absent external forces. In this regard, having the cover portions 162, 164 resting on the ledges 174 will substantially "lock" the carriage 130 in the closed position.

When it is then desired to interconnect (or disconnect) power and communication cables from the component section 132, the power center carriage 130 may be rotated (from the closed position shown in FIG. 4) by a user placing his or her fingertips within the slots 168. The user may then exert relatively minimal forces upwardly on the front rectangular portion 162 of the cover 160. In this manner, the front cover portion 162 will rotate about the hinge 166 relative to the rear cover portion 164. Simultaneously, the carriage 130 will rotate about a longitudinal axis through the centers of coaxial stubs 170. As the carriage 130 is rotated, the rear cover portion 164 will move upwardly and rearwardly off of the rear ledge 174, thereby "unlocking" the cover 160. The result of this rotation is primarily shown in FIG. 2. When the cover 160 is appropriately rotated so as to provide the power center carriage in an open position with the component section 132 accessible to the user, the user may then connect (or disconnect) appropriate connectors and cables to the data ports 136, electrical receptacles 142 and/or other similar power and communications energizing devices. As an example, FIG. 2 illustrates a conventional power cord 176, with a terminal blade section 178 and a cord portion 180 interconnected to one of the electrical receptacles 142. If desired, and as also shown in FIG. 2, when the power cord 176 is interconnected with one of the electrical receptacles 142, "slack" sections of the cord portion 180 may be placed within the open area 172 of the rectangular sleeve 108. This excess cord may therefore be positioned below (and substantially "hidden" from view) the work surface 102 so that it will not interfere with work being done on the work surface 102 around the power center system 100.

With the rotation of the carriage 130 to an open position as shown in FIG. 2, it is also feasible to appropriately size and position the component section 132 so that the center of gravity of the carriage 130 is located such that the carriage 130 is maintained in the open position without correspondingly exerting external forces on the carriage 130. The exact design of this concept is dependent on parameters such as size and weight of the carriage components.

Following interconnection of the power cord 176 to an appropriate one of the electrical receptacles 142, and the storage of excess of the cord portion 180 within the open area 172, the cover 160 can then be returned from the open position shown in FIG. 2 to the closed position shown in FIG. 4. Depending on the location of the center of gravity of carriage 130, closure may occur merely by removing external forces from the cover 160 or, alternatively pressing downward on the front cover portion 162. The carriage 130 will rotate about the longitudinal axis of the coaxial stubs 170, while the front cover portion 162 pivots about the hinge 166 relative to the rear cover portion 164. The front and rear cover portions 162, 164 will then return to their positions resting on the ledges 174. For purposes of illustration, FIG. 4 shows only one cord 180 extending through one of the slots 168. However, also for purposes of illustration, FIG. 4 further illustrates a communication line 182 which may be interconnected to one of the data ports 136 extending through the other of the slots 168.

Figure 5:
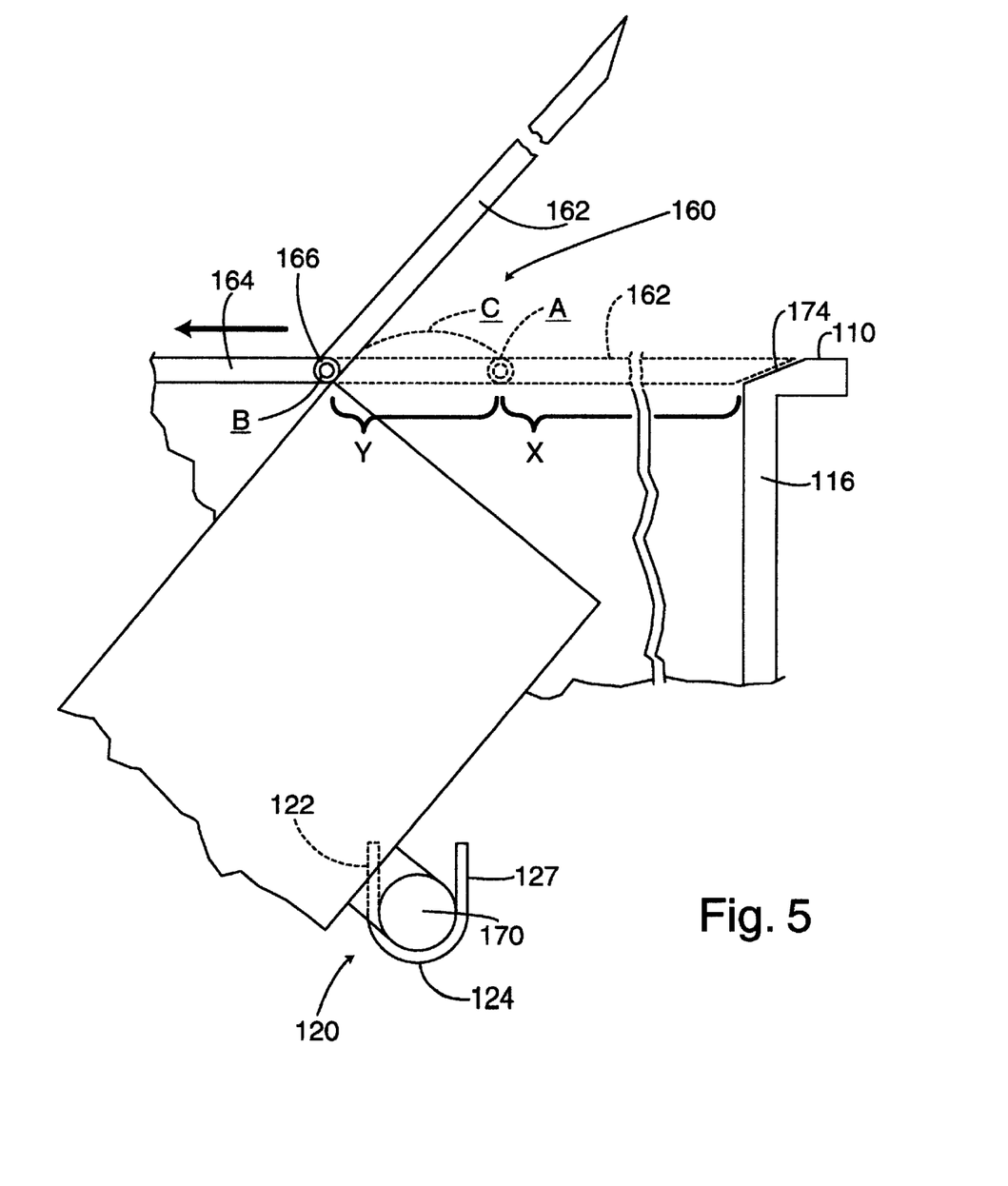
FIG. 5 is a partial sectional view, similar to FIG. 2, and showing the path of movement traversed by the power center carriage, when the carriage is moved from an open position to a closed position.

With reference to both FIGS. 2 and 5, it should be noted that when the cover 160 is rotated so that the front cover portion 162 rotates relative to the rear cover portion 164 through the action of the piano-type hinge 166, and the component section 132 is thereby rotated to an open position, the cover 160 (and, in particular, the rear portion 164) will move rearwardly, with the piano-type hinge 166 actually having an arcuate movement, whereby the axis of the hinge 166 will move slightly upward and rearwardly as the cover 160 is moved from a closed to an open position. This general concept is shown in an "exaggerated" orientation in FIG. 5. More specifically, in FIG. 5, the position of the axis of the piano-type hinge 166 when the cover 160 is in the closed position is shown as axis location A. Correspondingly, the path of travel of the piano-type hinge 166 as it moves from the axis location B (the open position) to axis location A (the closed position) is illustrated as path C. One of the advantages in accordance with the invention is shown by the particular type of travel path of the axis of the piano-type hinge 166. More specifically, it may be thought that a power center in accordance with the invention could utilize a piano-type hinge 166 located in a fixed position at location A shown in FIG. 5. That is, the front cover portion 162 would merely rotate about the piano-type hinge 166, without any movement whatsoever of the hinge 166 (other than rotational movement about its central axis of rotation). The hinge 166 would remain therefore stationary relative to the other portions of the part center system 100. However, if such would be the case, the opening which would be provided for access by a user to the component section 132 would comprise the opening shown as having a depth X in FIG. 5. Instead, with the movement of the axis of the piano-type hinge 166 rearwardly during the opening of the cover 160, an additional depth (shown as depth Y in FIG. 5) is provided. Accordingly, with a cover 160 and component section 132 configured in this manner in accordance with the invention, a more accessible opening is provided, without requiring any need to increase the size of the slot 104 within the work surface 102. This type of arrangement is obtained in part through having the "true" axis of rotation of the power center carriage 130 and component section 132 through a longitudinal axis extending through the coaxial centers of the stubs 170 below the horizontal plane of the cover 160 (when the cover 160 is in the closed position). That is, although the front cover portion 162 rotates relative to the rear cover portion 164 of the cover 160 through the piano-type hinge 166, it is the axis of rotation extending through the centers of the stubs 170 about which the component section 132 will rotate. That is, this axis of rotation is provided below the normal horizontal plane of the cover 160, when the cover 160 is in the closed position. The increase in the opening distance is particularly advantageous with respect to accessing the component section 132 for connecting and disconnecting power cords, communication cables, and the like.

Further, if desired, the inventor believes that the component section 132 may be configured so that the cover 160 and component section 132 will "normally" maintain itself in the open position, when the front cover portion 162 is sufficiently rotated so as to have the piano-type hinge 166 extend rearwardly of the center of gravity of the component section 132. In this manner, if desired, the component section 132 can be maintained in the open position, without the user continuing to exert any forces on the cover 160. With this type of configuration, the cover 160 could then be closed by having the user exert downward pressure on the front cover portion 162. To ensure that the cover would then remain closed, the rotation to the closed position of the cover 160 would necessarily be required in a manner so that the center of gravity of the component section 132 would be forward of the axis of the piano-type hinge 166 when the cover 160 is in the closed position. Alternatively, however, the ledges 174 may be used to secure the cover 160 in the closed position.

Still further, another advantage of certain of the novel components of a power center system in accordance with the invention relates to simplicity of construction with respect to modification of the orientation of the system 100. For example, if it is desired to have the communication and power receptacles and ports of the component section 132 face in an opposing direction, the entirety of the power center carriage 130 may be lifted upwardly and rotated 180 degrees, thereafter being replaced within the stationery housing 106. That is, the entirety of the carriage 130 is "reversible" without requiring complex assembly/disassembly.

In summary, the foregoing power center system provides a convenient means for providing electrical power, communication ports, and other types of electrical/communication devices accessible to a user, without substantial complexity in design or construction. The power center system 100 in accordance with the invention comprises relatively few connecting parts, such as screws and the like. Also, without a requirement of increasing the size of the slot 104, the power center system 100 in accordance with the invention provides a relatively wide area of access when in the open position. Further, the system 100 in accordance with the invention comprises means for storage or "hiding" excess cable, even when the system 100 is in a closed position. Still further, the system 100 in accordance with the invention provides convenient and relatively simplistic means for reorienting the orientation of the communications and electrical power component section 132, again without requiring relatively complex assembly/disassembly or the like.

More specifically with respect to storing excess wires or cables, the relatively larger excess opening, as earlier mentioned, facilitates storage of excess cable when the power center system 100 is in the open position. In addition, when the wires or cables are stored beneath the cover 160, and the power center system 100 is moved to a closed position, the wires or cables are substantially "pushed together," with the "bulk" of the wires or cables below the work surface 102. In general, a rotatable power center in accordance with the invention facilitates providing an open area for access to wires or cables, and an area for storage of excess of wires or cables.

Figure 6:
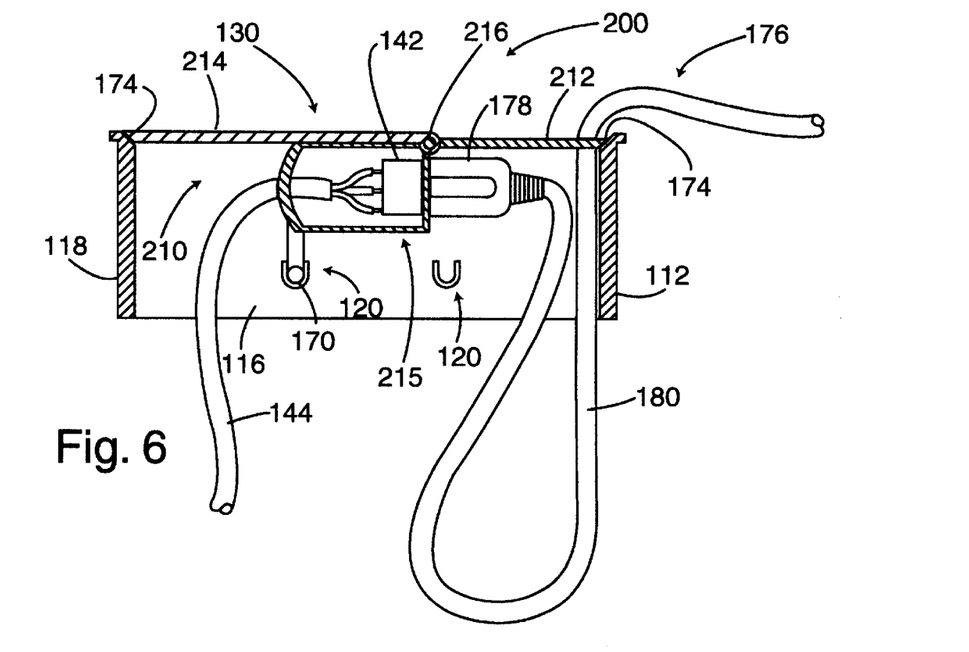
FIG. 6 is a partial sectional view, similar to FIG. 2, of a second embodiment of the rotatable power center, when the second embodiment of the power center is a closed position, and with the second embodiment having a variation with respect to front and rear cover configurations, and with the second embodiment having a reversible configuration.
Figure 7:
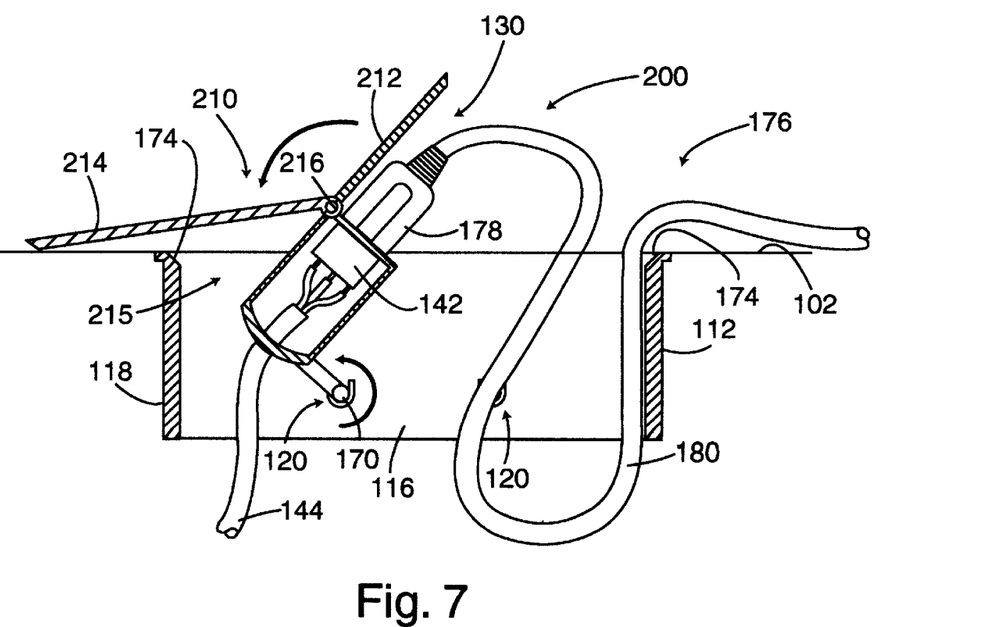
FIG. 7 is a partial sectional view of the second embodiment of the rotatable power center shown in FIG. 6, with the power center in a partially open position.

In addition to the power center system 100 illustrated in FIGS. 1–5, other embodiments of a rotatable power center in accordance with the invention can be employed. For example, a second embodiment of a power center system in accordance with the invention is illustrated in FIGS. 6 and 7 as system 200. For purposes of understanding, the additional embodiments shown in FIGS. 6 and 7, and also shown in FIGS. 8–13 utilize reference numerals corresponding to the reference numerals utilized for the power center system 100 illustrated in FIGS. 1–5 for similarly functioning or substantially identical elements.

More specifically, the power center system 200 includes two receiving flanges 120 located on the vertical side component 116 illustrated in FIGS. 6 and 7, and with a corresponding pair of receiving flanges 120 (not shown) being located on an opposing vertical side component (not shown). The vertical side component which is not shown would correspond to the vertical side component 114 illustrated in FIG. 1 for the power center 100. One set of receiving flanges 120 is used to receive the stubs 170 when the carriage 130 is to be facing in a forward direction, defined as the direction shown in FIGS. 6 and 7. It should be emphasized that all of the views shown in FIGS. 6–8 and 10—10 substantially correspond to the view of FIG. 2 for power center system 100. Correspondingly, when it is desired to have the carriage 130 face in the opposing direction, the entirety of the carriage 130 may be lifted upwardly, rotated 180°, and received in the other set of receiving flanges 120. Again, this reversibility is provided without requiring any complex assembly/disassembly.

As with the embodiment of power center system 100, the embodiment of power center system 200 includes conventional electrical receptacles 142 for supplying power to AC voltage devices. The receptacles 142 are interconnected to conventional incoming power cables 144, which may be energized through conventional incoming AC power outlets (not shown). When the carriage 130 is rotated to an open position as shown in FIG. 7, the power cord 176 may be connected to an appropriate one of the electrical receptacles 142, and the "slack" section of the cord portion 180 may be placed within an open area 172 below the horizontal work surface 102. Although not specifically shown in FIGS. 6 and 7, the cover portion of the carriage 130 will have slots corresponding to the slots 168 of the power center system 100 illustrated in FIG. 4. These slots will allow the cords 176 to remain energized with the receptacles 142 when the cover portion is in a closed position.

Continuing with respect to FIGS. 6 and 7, the power center carriage 130 can include a cover 210 comprising a front portion 212 and a rear portion 214. The front portion 212 and the rear portion 214 are somewhat similar in structure and function to the front portion 162 and rear portion 164, respectively, of the power center system 100. The front portion 212 and the rear portion 214 are rotatable relative to each other and interconnected through a piano-type hinge 216 which extends lengthwise between the cover portions 212, 214. The piano-type hinge 216 provides a means for rotation of the front coverage portion 212 relative to the rear cover portion 214, and is somewhat similar in structure and function to the piano-type hinge 166 of power center system 100.

The power center system 200 has some variations, however, relative to the power center system 100. For example, with the power center system 100 shown in FIG. 5, the receiving flange 120 was located at a position which was substantially near the middle or center of the depth-wise dimension of the rectangular sleeve 108. In contrast, in the configuration shown in FIGS. 6–8, the receiving flange 120 is located rearward of the depth-wise center. That is, the receiving flange 120 utilized when the carriage 130 is facing forwardly is closer to the rear vertical wall 118 than to the front vertical wall 112.

The component section 215 of the power center carriage 130 comprising electrical receptacles 142 can be secured by an appropriate connecting means (not shown) or can otherwise be integral with the front rectangular cover portion 212. The component section 215 is positioned below and to the rear of the cover portion 212, as with the power center system 100. When the front cover portion 212 is rotated relative to the rear cover portion 214 of the cover 210, the electrical receptacles 142 of the component section 215 will move in correspondence and simultaneously with the front cover portion 212.

As with the power center system 100, the power center carriage 130 of the power center system 200 includes a pair of protruding stubs 170, extending laterally outward at opposing sides of the carriage 130. The cylindrical stubs 170 may rotatably rest on a corresponding one of the receiving flanges 120.

With the foregoing configuration, the illustration of power center system 200 in FIG. 6 may be characterized as showing the power center carriage 130 being in a closed position. In this position, each of the portions 212 and 214 of the cover 210 are in a substantially horizontal orientation. As with the power center system 100, in this configuration as shown in FIG. 6, the front cover portion 212 and the rear cover portion 214 may be resting on beveled ledges 174 of the side portions 112, 118. Further, with the cover 210 in a closed position as shown in FIG. 6, the center of gravity of the carriage 130 may be such so as to maintain the carriage 130 in the closed position, absent external forces. In this regard, having the cover portions 212, 214 resting on the ledges 174 will substantially "lock" the carriage 130 in the closed position.

Figure 8:
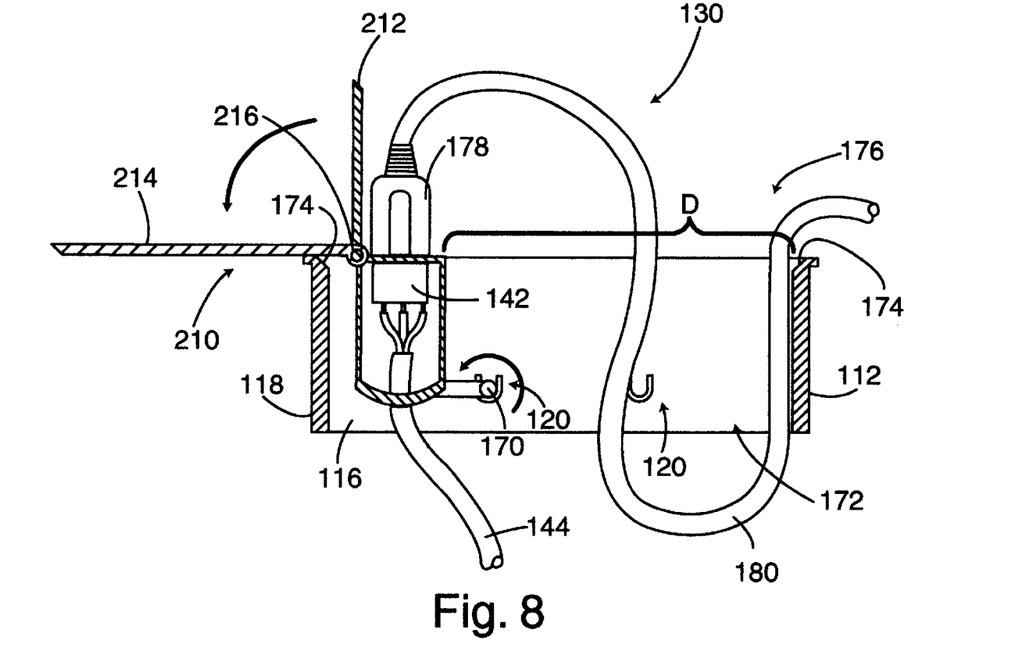
FIG. 8 is a partial sectional view of the second embodiment of the power center shown in FIG. 6, and showing a variation where the power center is in a fully open position, which may be maintained stationary.

When it is then desired to interconnect (or disconnect) wires and cables from the electrical receptacles 142, the power center carriage 130 may be rotated (from the closed position shown in FIG. 6) by a user placing his or her fingertips within slots (not shown) located within the front cover portion 212. Although not shown in these drawings, the slots would be similar to the slots 168 illustrated in FIG. 4 with respect to the power center system 100. The user may then exert relatively minimal forces upwardly on the front cover portion 212 of the cover 210. In this manner, the front cover portion 212 will rotate about the hinge 216 relative to the rear cover portion 214. Simultaneously, the carriage 130 will rotate about a longitudinal axis through the centers of coaxial stubs 170 supported in the receiving flanges 120. As the carriage 130 is rotated, the rear cover portion 214 will move upwardly off of the rear ledge 174, thereby "unlocking" the cover 210. The result of this rotation, with the carriage 130 shown in a partially open position, is shown in FIG. 7. However, if desired, the user may rotate the carriage 130 to a fully open position as shown in FIG. 8. When the cover 210 is rotated to this fully open position, a substantial access area, shown in FIG. 8 as having a depth D, is available to facilitate connection (or disconnection) of the power cord 176 to the receptacles 142 and to store or retrieve cord excess 180 from the open spatial area 172. Again, this extremely wide open spatial area is provided in part due to the positioning of the receiving flange 120 utilized for the particular configuration shown in FIGS. 6–8. With this wide opening and relative spatial access, the cords 176 can be readily connected to receptacles 142 and "slack" cord excess 180 may be positioned within the open area 172.

Following interconnection or disconnection, the cover 210 can then be returned from the open position shown in FIG. 8 to the closed position shown in FIG. 6, through the user exerting external forces on the front cover portion 212 so as to rotate the front cover portion 212 in a clockwise direction (as shown in FIGS. 6–8) about the axis of hinge 216. Again, the particular power center system 200 in accordance with the invention facilitates connection/disconnection of cords, wires and cables, and storage of cable excess through the providing of relatively open access and spatially large areas.

Figure 9:
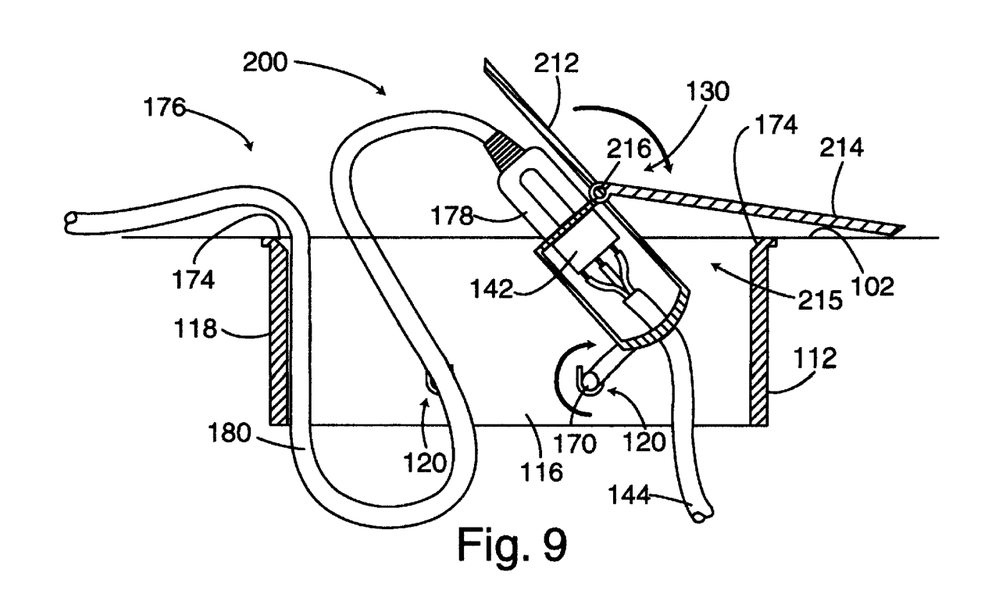
FIG. 9 is a partial sectional view, similar to FIG. 2, showing a third embodiment of a rotatable power center in accordance with the invention, with the third embodiment comprising a reversible configuration of the second embodiment shown in FIG. 6.

As earlier mentioned, the power center system 200 in accordance with the invention is also "reversible," as is the power center system 100. However, for the power system 200 to be reversed, the entirety of the power center carriage 130 is lifted upwardly, rotated 180°, and then replaced so that the stubs 170 are received within the other set of the receiving flanges 120. This reversed orientation is shown in FIG. 9, with the power center system 200 being in a partially open position, and facing in a direction opposing the direction shown in FIGS. 6–8. In this manner, the entirety of the carriage 130 of power center system 200 is "reversible" without requiring complex assembly/disassembly.

Figure 10:
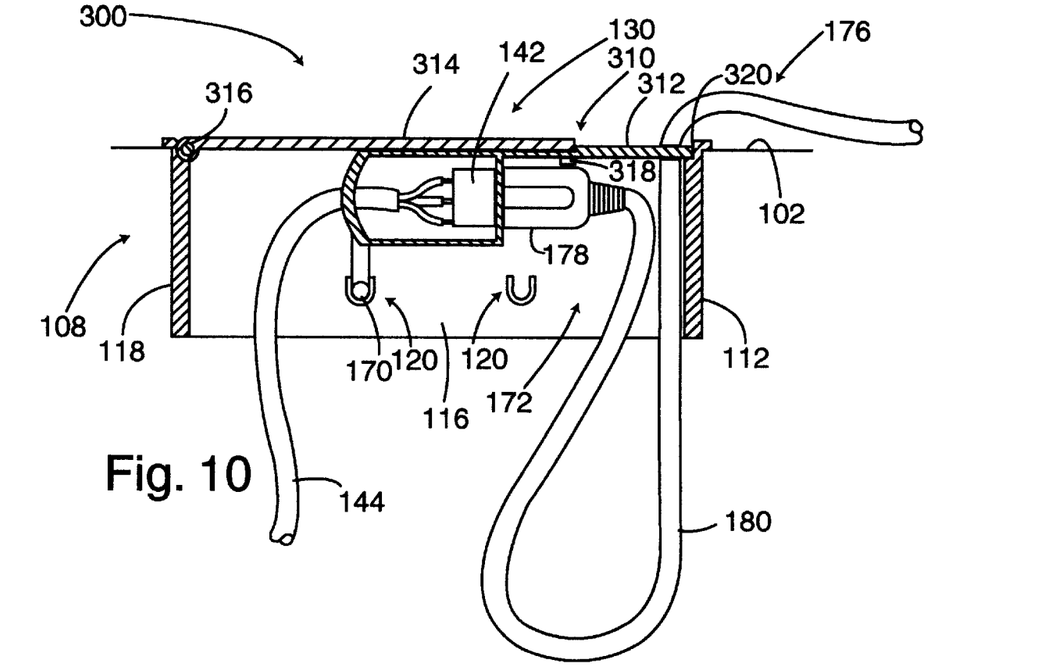
FIG. 10 is a partial sectional view, similar to FIG. 2, showing a fourth embodiment of a rotatable power center in accordance with the invention, with the power center in a closed position.
Figure 11:
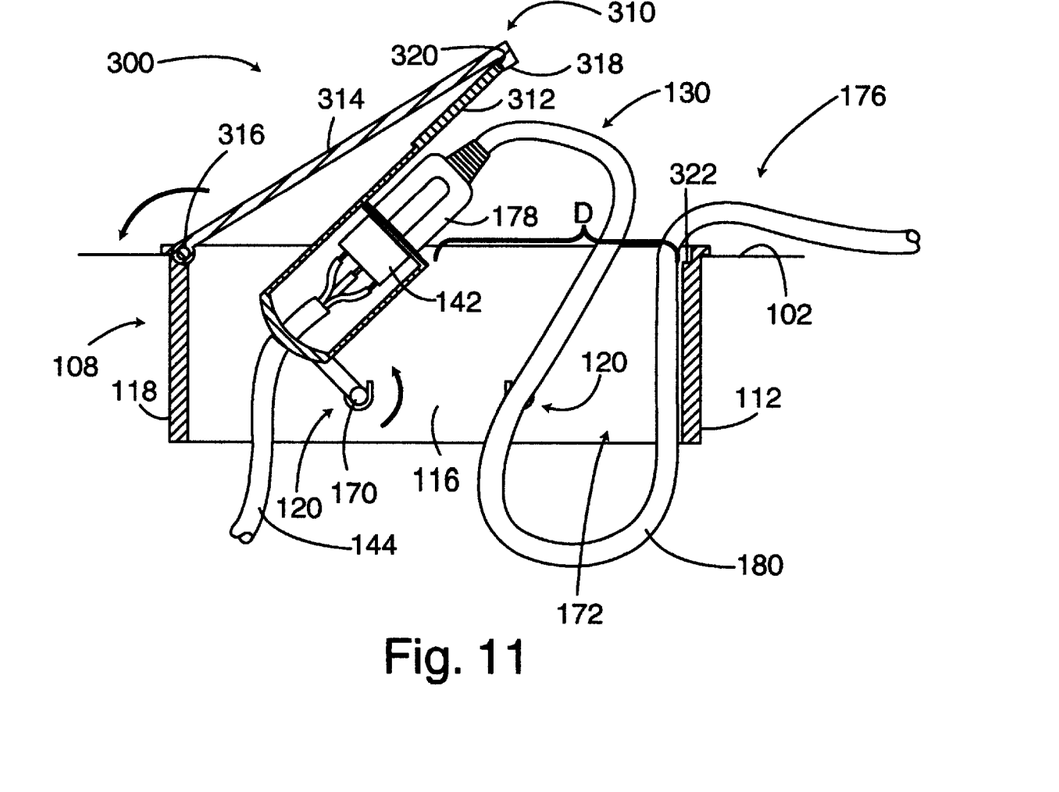
FIG. 11 is a partial sectional view, similar to FIG. 2, showing the rotatable power center illustrated in FIG. 10 in an open position.

In addition to the power center systems 100 and 200 illustrated in FIGS. 1–9, still further embodiments of a rotatable power center in accordance with the invention can be employed. For example, another embodiment of a power center system in accordance with the invention is illustrated in FIGS. 10 and 11 as system 300. For purposes of understanding, the additional embodiments shown in FIGS. 10 and 11 utilize reference numerals corresponding to the reference numerals utilized for the power center system 100 illustrated in FIGS. 1–5 for similarly functioning or substantially identical elements.

More specifically, the power center system 300 includes a single receiving flange 120 located on the vertical side component 116 illustrated in FIGS. 10 and 11, with a corresponding receiving flange 120 (not shown) being located on an opposing vertical side component (not shown). The receiving flanges 120 are utilized to receive the stubs 170. It should be noted that with respect to the particular embodiment of a power center system in accordance with the invention as shown in FIGS. 10 and 11, this particular embodiment is not reversible and utilizes only a single pair of receiving flanges 120.

The power center system 300, as with the embodiments of power center systems 100 and 200, includes conventional electrical receptacles 142 for supplying power to electrical devices. The receptacles 142 are interconnected to conventional incoming power cables 144, which may be energized through conventional incoming power outlets (not shown). When the carriage 130 is rotated to an open position as shown in FIG. 11, the power cord 176 may be connected to an appropriate one of the electrical receptacles 142, and the "slack" section of the cord portion 180 may be placed within an open area 172 below the horizontal work surface 102. Although not specifically shown in FIGS. 10 and 11, the cover portion of the carriage 130 may include slots corresponding to the slots 168 of the power center system 100 illustrated in FIG. 4. These slots will allow the cords 176 to remain energized with the receptacles 142 when the cover portion is in a closed position.

Continuing the description with respect to FIGS. 10 and 11, the power center carriage 130 includes a cover portion which is somewhat unique, relative to the cover portions of the carriages associated with the power center systems 100 and 200. More specifically, the power center carriage 130 of the system 300 includes a cover 310 having a forward, inner portion 312 and a rear portion 314. Unlike the covers of the power center systems 100 and 200, the rear cover portion 314 of power center system 300 is rotatably interconnected to the rectangular sleeve 108 and, in particular, the component 118 through a piano-type hinge 316. The piano-type hinge 316 extends lengthwise along the rear side component 118 at its upper portion thereof, and provides for rotation of the rear cover portion 314 relative to the sleeve 108.

The front cover portion 312 includes one or more slots (not shown) into which one or more bosses 318 may be inserted when the cover 310 is in the closed position as shown in FIG. 10. The bosses 318 are located at the distal end of the rear cover portion 314.

When it is desired to open the cover 310, the power center carriage 130 may be rotated (from the closed position shown in FIG. 10) by a user placing his or her finger tips within slots (not shown) located within the front cover portion 312. The user may then exert relatively minimal forces upwardly on the front cover portion 312 of the cover 310. In this manner, the front cover portion 312 will rotate about a longitudinal axis through the center of coaxial stubs 170 supported in the receiving flanges 120. As the carriage 130 is rotated, the rear cover portion 314 will move in a manner relative to the front part cover portion 312 such that the rear cover portion 314 will move so as to disengage the bosses 318 from the slots or other openings within the front cover portion 312.

As shown in FIG. 1, the cover 310 will then rotate such that the rear cover portion 314 is rotating about the hinge 316 relative to the sleeve 108. As further shown in FIG. 11, the front cover portion 312, attached as part of the carriage 130, can rotate counter clockwise in correspondence with the rear cover portion 314, until a front edge portion 320 of the front cover portion 312 engages a lower portion of the boss or bosses 318 of the rear cover portion 314. If the user then releases forces on the front cover portion 312, the front cover portion 312 and the corresponding carriage 130 will essentially be "locked" in a stationery position relative to the rear cover portion 314, again as primarily shown in FIG. 11. In this manner, the carriage 130 is maintained in an open position, without requiring any additional forces to be exerted by the user. When the cover 310 is rotated to this fully opened position, a substantial access area, shown in FIG. 11 as having a depth D, is available to facilitate connection (or disconnection) of the power cord 176 to the receptacles 142, and to store or retrieve cord excess 180 from the open spatial area 172. Again, this extremely wide, open spatial area is provided in part due to the positioning of the receiving flanges 120 utilized for this particular configuration. Also, this configuration is achieved in part as a result of the use of the hinge connection 316 between the rear cover portion 314 and the sleeve 108.

Also as with the power center system 100, the front cover portion 312 may rest on a ledge 322 (FIG. 11) of the side portion 112. Further, with the cover 310 in a closed position as shown in FIG. 10, the center of gravity of the carriage 130 may be such as to maintain the carriage 130 in the closed position, absent external forces. In this regard, the carriage 130 is substantially "locked" in the closed position, absent the user exerting external forces.

Figure 12:
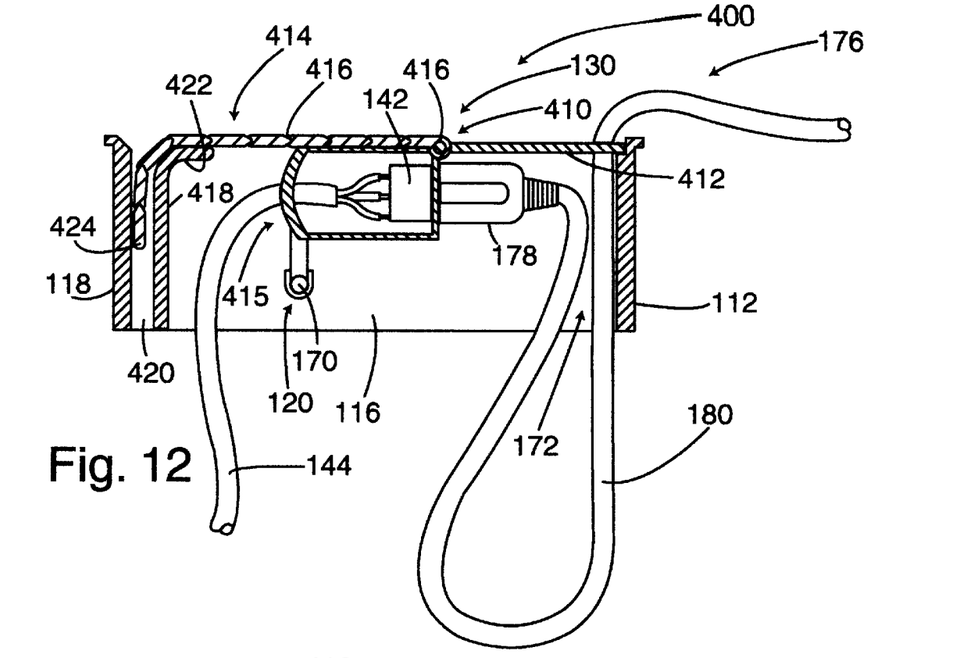
FIG. 12 is a partial sectional view, similar to FIG. 2, and showing a fifth embodiment of a rotatable power center in accordance with the invention, with the power center in a closed position.
Figure 13:
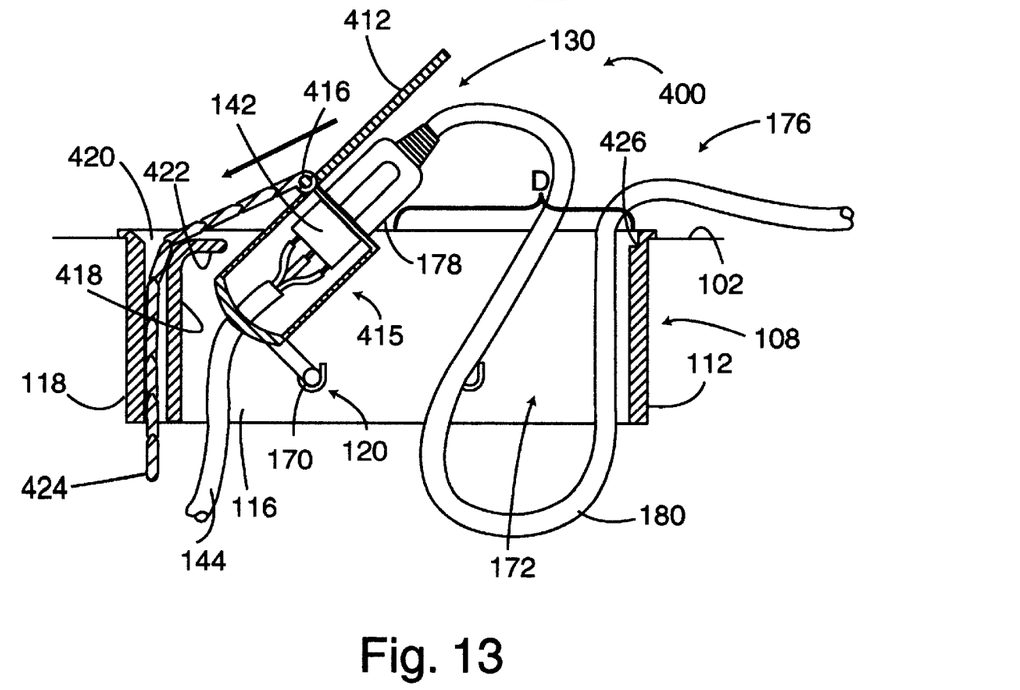
FIG. 13 is a partial sectional view, similar to FIG. 2, and showing the rotatable power center of FIG. 12 in a partially open position.

A still further embodiment of a power center system in accordance with the invention is illustrated in FIGS. 12 and 13 as power center system 400. For purposes of understanding, the additional embodiment shown in FIGS. 12 and 13 utilizes references numerals corresponding to the reference numerals utilized for the power center system 100 illustrated in FIGS. 1–5, for a similarly functioning or substantially identical elements. More specifically, the power center system 400 includes a single set of receiving flanges 120, with one of the receiving flanges 120 located on the vertical side component 116 illustrated in FIGS. 12 and 13. A corresponding receiving flange 120 (not shown) is located on an opposing vertical side component (not shown). In the embodiment illustrated in power center system 100, this vertical side component is component 114. This pair of receiving flanges 120 is utilized to receive the stubs 170 which are located on the carriage 130. As with the power center system 300 illustrated in FIGS. 10 and 11, the power center system 400 is not designed for purposes of reversibility. Accordingly, only a single pair of receiving flanges 120 is utilized.

As with the prior embodiments of power center systems described herein, the system 400 includes conventional electrical receptacles 142 for supplying power to AC voltage devices. The receptacles 142 are interconnected to conventional incoming power cables 144, which may be energized through conventional incoming AC power outlets (not shown). When the carriage 130 is rotated to an open position as shown in FIG. 13, the power cord 176 may be connected to an appropriate one of the electrical receptacles, and the "slack" section of the cord portion 180 may be placed within an open area 172 below the horizontal work surface 102. Although not specifically shown in FIGS. 12 and 13, the cover portion of the carriage 130 will have slots corresponding to the slots 168 of the power center system 100 illustrated in FIGS. 4. These slots will allow the cord portions 176 to remain energized with the receptacles 142, when the cover portion is in a closed position.

Further with respect to FIGS. 12 and 13, the power center carriage 130 includes a cover portion somewhat distinctive relative to the cover portions of the previously described power center systems. More specifically, the power center carriage 130 includes a cover portion 410 having a front portion 412 and a rear portion 414. The front portion 412 is somewhat similar in function to the front portion 162 of the power center system 100. Also, the front portion 412 and the rear portion 414 are rotatable relative to each other and interconnected through a piano-type hinge 416 which extends lengthwise between the cover portions 412, 414. The piano-type hinge 416 provides a means for rotation of the front cover portion 412 relative to the rear cover portion 414. In this manner, it is somewhat similar in structure and function to the piano-type hinge 166 of the power center system 100.

Unlike the previously described power center systems, the rear cover portion 414 of the cover 410 is not merely a planar component. Instead, the rear portion 414 comprises a series of links 416 which are coupled to each other by conventional means so that each of the links 416 is flexible and movable relative to adjacent links 416. These links 416 can be constructed of any suitable materials and interconnected with adjacent links by any number of conventional means. For example, relatively small hinges may be utilized between the links 416. Also, interconnection components such as those which are found in conventional wristwatches having flexible bands and the like may be employed. Accordingly, any number of individual linkages may be utilized without departing from the novel concepts of the invention. Still further, the links 416 may be constructed and interconnected in a manner similar to the configuration which is well known and employed for covers for "roll-top" desks, which were commonly used at the beginning of this century.

Also distinct from the previously described embodiments of power center systems in accordance with the invention, the rear side includes an additional upstanding bracket 418 which is positioned inwardly from the rear side component 118 and substantially parallel thereto. The rear side component 118 and the bracket 418 form a slot 420 therebetween, as primarily shown in FIG. 12. As further shown in FIGS. 12 and 13, the bracket 418 can include an upper portion 422 which is curved inwardly.

As with the power center system 200, the receiving flanges 120 can be located rearward of the depth-wise center. That is, the receiving flanges utilized with the power center system 400 are closer to the rear vertical wall 118 then to the front vertical wall 112. The component section 415 of the power center carriage 130 comprising the electrical receptacles 142 can be secured by an appropriate connecting means (not shown) or can otherwise be integral with the front rectangular cover portion 412. The component section 415 is positioned below and to the rear of the front cover portion 412, as with the power center system 100. When the front cover portion 412 is rotated relative to the rear cover portion 414 of the cover 410, the electrical receptacles 142 will move in correspondence and simultaneously with the front cover portion 412.

As with the power center system 100, the power center carriage 130 includes a pair of protruding stubs 170, extending laterally outward at opposing sides of the carriage 130. The cylindrical stubs 170 may rotatably rest on a corresponding one of the receiving flanges 120. With the foregoing configuration, an illustration of power center system 400 in FIG. 12 may be characterized as showing the power center carriage 130 being in a closed position. In this position, the front cover portion 412 and the rear cover portion 414 are in a substantially horizontal orientation. However, a distal end portion 424 is partially engaged within the slot 420 as shown in FIG. 12. As with the power center system 100, in this configuration as shown in FIG. 12, the front cover portion 412 may be resting on a ledge 426 of the front side portion 112. Further, with the cover 410 in a closed position as shown in FIG. 12, the center of gravity of the carriage 130 may be such so as to maintain the carriage 130 in the closed position, absent external forces. In this regard, having the cover portion 412 rest on the ledge 426 substantially "locks" the carriage 130 in the closed position. In part, this is provided by the position of the receiving flanges 120, relative to the carriage 130.

When it is desired to interconnect (or disconnect) wires and cables from the electrical receptacles 142, the power center carriage 130 may be rotated (from the closed position shown in FIG. 12) by a user placing his or her finger tips within slots (not shown) within the front cover portion 412. Although not shown in these drawings, the slots would be similar to the slots 168 illustrated in FIG. 4 with respect to the power center system 100. The user may then exert relatively minimal forces upwardly on the front cover portion 412 of the cover 410. In this manner, the front cover portion 412 will rotate about the hinge 416 relative to the rear cover portion 414. Simultaneously, the carriage 130 will rotate about a longitudinal axis through the centers of coaxial stubs 170 supported in the receiving flanges 120. As the carriage 130 is rotated, the rear cover portion 414 will actually further engage itself within the slot 420 formed between the rear side portion 118 and the bracket 418. That is, as the carriage 130 is rotated in the counter clockwise direction, the links 416 of the rear cover portion 414 will move further into the slot 420 and downward therein as illustrated in FIG. 13. In this manner, the rear cover portion 414 essentially "hides itself" and does not take up any additional spatial area on the work surface 102 when the carriage 130 is in an open position.

The rotation of the carriage 130 may continue to a partially open position as shown in FIG. 13. However, if desired, the user may rotate the carriage 130 to a fully open position. In the fully open position, the component section 415 of the power center carriage 130 will actually abut the upper lip portion 422 of the bracket 418. In this manner, further movement of the carriage 130 will be prohibited. Although the cover 410 may be rotated to the fully opened position, even with the cover rotated to the partially open position as illustrated in FIG. 13, a substantial access area (shown in FIG. 13 as having a depth D) is available to facilitate connection (or disconnection) of the power cord 176 to the receptacles 142, and to store or retrieve cord excess 180 from the open spatial area 172. This extremely wide open spatial area is provided in part due to the positioning of the receiving flanges 120 utilized for the particular configuration shown in FIGS. 12 and 13.

Following interconnection or disconnection, the cover 410 can then be returned from the open position shown in FIG. 13 to the closed position shown in FIG. 12, through the user exerting external forces on the front cover portion 412 so as to rotate the front cover portion 412 in a clockwise direction (as shown in FIGS. 12, 13) about the axis of hinge 416. Correspondingly, the entirety of the carriage 130 will also be simultaneously rotating about the longitudinal axis extending through the stubs 170. With the particular configuration shown in FIGS. 12 and 13 for a power center system 400 in accordance with the invention, the use of a flexible rear cover portion provides the capability of essentially "hiding" a substantial portion of the rear cover portion when the carriage 130 is in an open position.

It will be apparent to those skilled in the pertinent art that other embodiments of power center systems in accordance with the invention may be designed. That is, the principles of a power center system in accordance with the invention are not limited to the specific embodiments described herein. For example, mechanisms other than the stubs and receiving flanges utilized in the embodiments for providing rotational movement may be employed. Accordingly, it will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed are defined as follows:

1. A power center for supplying electrical power services and communication services, said power center comprising:
   a stationary housing forming an inner spatial area located below a plane extending substantially through an upper portion of said housing;
   carriage means coupled to said stationary housing so as to be movable with respect to said housing between a closed position and an open position;
   energy source means for supplying electrical power and communication service from interconnectable common power source lines and communications lines;
   energizing means mounted to said carriage means and connected to said energy source means for supplying power and communication service from said energy source means to selectively interconnectable electrical and communication devices;
   coupling means connected to said stationary housing and to said carriage means, and forming an axis of rotation about which said carriage means rotates relative to said stationary housing; and
   said coupling means is positioned on said carriage means and said housing so that said axis of rotation is below said plane extending substantially through an upper portion of said housing.

2. A power center in accordance with claim 1 characterized in that said power center further comprises cover means pivotably coupled to said carriage means, for providing a cover for said power center when said carriage means is in said closed, position.

3. A power center in accordance with claim 2 characterized in that said power center further comprises pivot means coupled to said cover means and to said carriage means for providing capability of pivotable movement of said cover means relative to said carriage means, said pivot means comprising an axis of pivotable movement which moves rearwardly relative to said stationary housing when said carriage means moves from said closed position to said open position.

4. A power center in accordance with claim 2 characterized in that said power center is adapted to be mounted in a desk or other furniture component having a work surface, at a selectable working height, and said stationary housing is adapted to be mounted within a slot formed in said work surface.

5. A power center in accordance with claim 4 characterized in that said plane extends substantially through or adjacent said work surface.

6. A power center in accordance with claim 4 characterized in that when said carriage means is in said open position, said energizing means are angled upwardly in a manner so as to be accessible to a user for purposes of interconnecting electrical cords and communication lines of said selectively interconnectable electrical and communication devices to said energizing means.

7. A power center in accordance with claim 2 characterized in that when said carriage means is in said closed position, said cover means is appropriately structured and said carriage means is appropriately positioned within said inner spatial area for purpose of excess of electrical cords communication lines interconnected to said energizing means may be stored within said inner spatial area.

8. A power center in accordance with claim 7 characterized in that said carriage means and said cover means may be manually lifted upwardly from said stationary housing and reversed in position relative to said stationary housing, so that said energizing means are directed to a position opposing an original position, without requiring any assembly/disassembly of components of said power center.

9. A power center in accordance with claim 7 characterized in that said cover means comprises:

a front cover portion;

a rear cover portion; and pivot means connected to said front cover portion, said rear cover portion and said carriage means, for pivotably coupling said front cover portion to said rear cover portion.

10. A power center in accordance with claim 9 characterized in that said front cover portion is pivotable relative to said rear cover portion, and said front cover portion moves in unison with said carriage means.

11. A power center in accordance with claim 10 characterized in that said rear cover portion slides rearwardly relative to said stationary housing, when said carriage means is moved from said closed position to said open position.

12. A power center in accordance with claim 7 characterized in that said cover means comprises a front cover portion having slot means which allow a user to manually manipulate said front cover portion when said carriage means is in said closed, position.

13. A power center in accordance with claim 1 characterized in that said carriage means moves between said closed position and said open position through rotation about said axis of rotation.

14. A power center in accordance with claim 13 characterized in that said axis of rotation remains stationary during movement of said carriage means from said closed position to said open position.

15. A power center in accordance with claim 13 characterized in that said power center further comprises cover means for covering said carriage means when said carriage means is in said closed position, said cover means comprising:

a rear cover portion pivotably coupled at its rear section to said stationary housing; and a front cover portion separate from said rear cover portion and fixedly connected to said carriage means, so that said front cover portion moves in unison with movement of said carriage means.

16. A power center in accordance with claim 15 characterized in that as said carriage means moves between said closed position and said open position about said axis of rotation, said rear cover portion pivots about its pivot axis relative to said stationary housing, so as to ride up on said front cover portion as said front cover portion and said carriage means rotate about said axis of rotation.

17. A power center in accordance with claim 1 characterized in that said coupling means comprises:

a pair of arcuate flanges mounted on opposing ends of said stationary housing; and a pair of stubs extending outwardly from opposing lateral sides of said carriage means, each of said stubs adapted to freely rotate within an arcuate formed area of each of said flanges.

18. A power center in accordance with claim 1 characterized in that said stationary housing comprises vertically disposed front, rear and side portions, an upper horizontal flange and a pair of beveled ledges formed between said horizontal flange and said front and said rear vertically disposed portions of said stationary housing.

19. A power center in accordance with claim 1 characterized in that said power center further comprises cover means for covering said carriage means when said carriage means is in said closed position, said cover means comprising:

a front cover portion fixedly connected to said carriage means, so that said front cover portion moves in unison with movement of said carriage means; and a rear cover portion rotatably coupled to said front cover portion, and comprising a flexible configuration so that said rear cover portion can exhibit flexible movement when said carriage means is moved toward said open position.

20. A power center in accordance with claim 19 characterized in that:

said stationary housing comprises a bracket and a rear side portion, forming a vertical slot therebetween; and said rear coverportion flexibly enters said vertical slot during movement of said carriage means from said closed position to said open position.

* * * * *